United States Patent Office 3,637,639
Patented Jan. 25, 1972

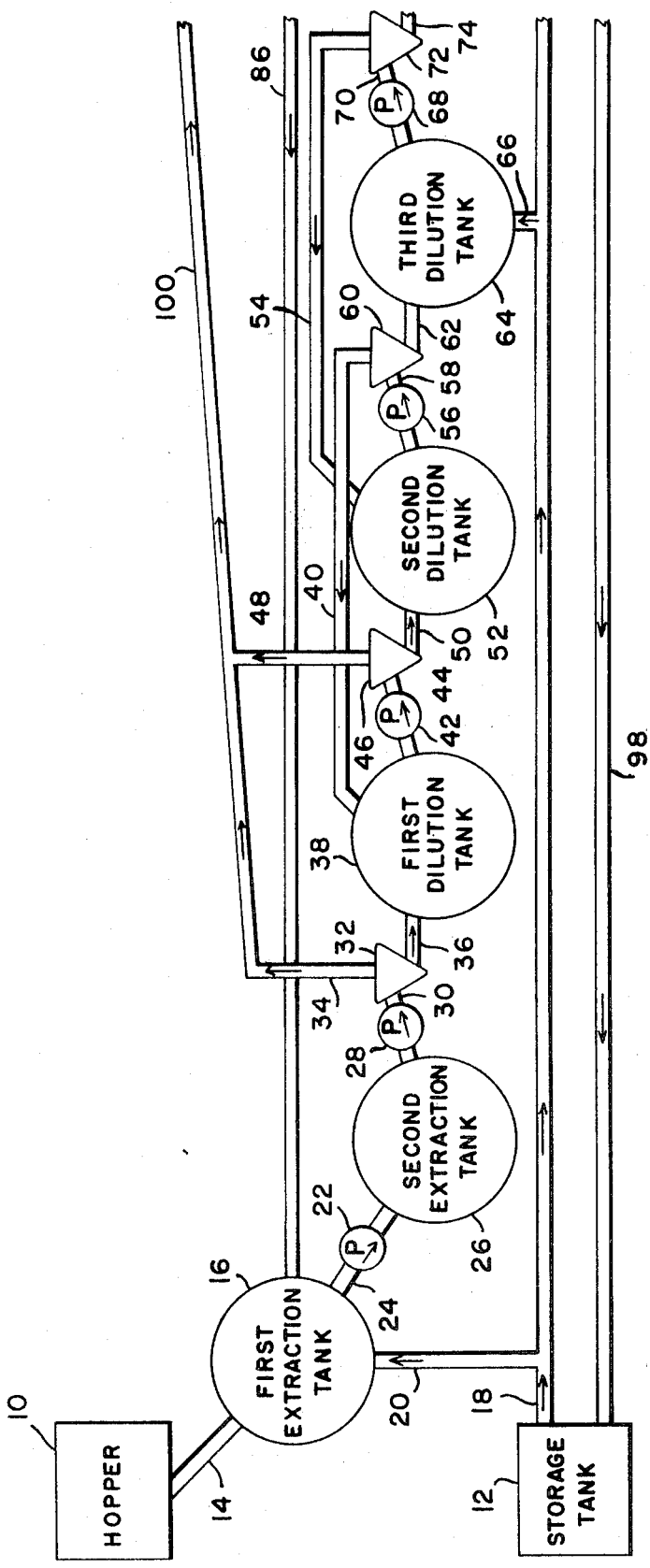

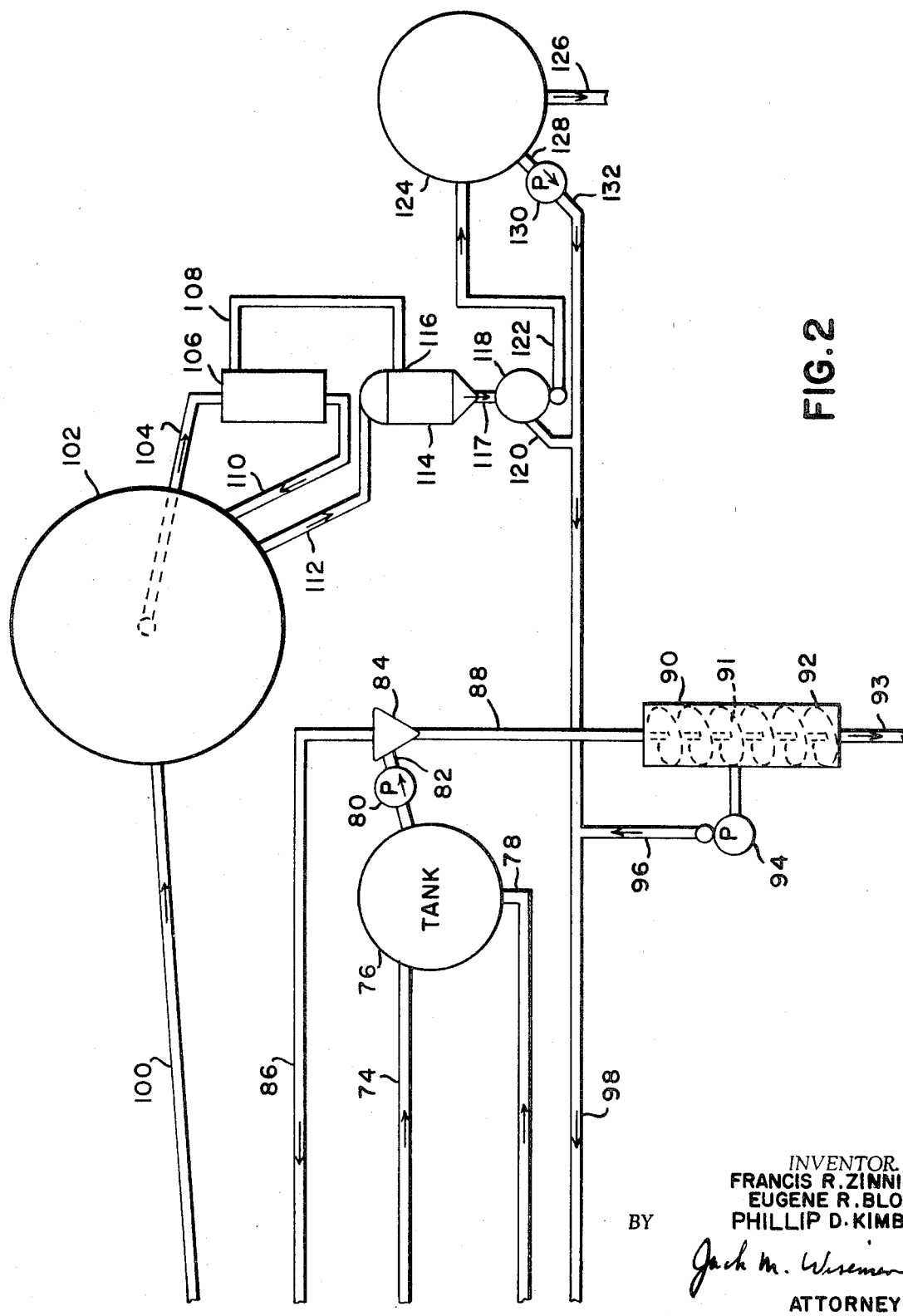

3,637,639
RESIN EXTRACTION PROCESS
Francis R. Zinniel, 1182 Westwood Drive, San Jose,
Calif. 95125, Eugene R. Blome, San Jose, Calif., and
Philip D. Kimball, Long Lake, Minn.; said Blome and
Kimball assignors to said Zinniel
Filed Oct. 28, 1968, Ser. No. 771,125
Int. Cl. C09f 1/00
U.S. Cl. 260—107
19 Claims

ABSTRACT OF THE DISCLOSURE

A continuous process for the extraction from resin-containing coal, of substantially all of the contained resin. The process provides for subjecting resin-containing coal fines to an integrated solvent-extraction and solution-separation procedure for obtaining both a first quantity of resin solution containing a major portion of the resin, and a mixture of coal fines and solution containing substantially all of the remaining portion of the resin; subjecting the mixture to a series of integrated solvent-dilution and solution-separation procedures for obtaining both a second quantity of resin solution containing substantially all of the remaining portion of the resin and a residual mixture of coal fines and solvent, recovering substantially all of the resin contained in the first and second quantities of solution; and recovering substantially all of the solvent employed.

BACKGROUND OF THE INVENTION

The present invention relates to the production of natural fossil resin, and more particularly to an improved process for the extraction of such resin from coal.

A problem has existed in the prior art, with respect to the recovery of the natural fossil resin found in certain coals, such as, e.g., some Utah coals. Processes have been known for the recovery of such resin from coal. The known processes, have, however, presented a number of disadvantages. Thus, such processes have often been inefficient, in that they have involved batch extraction operations, rather than being operated in a continuous manner. In addition, the known processes have involved substantial losses of solvents used in the extraction operations. The known processes, furthermore, have not provided for recovery of all of the resin present in the coal.

SUMMARY OF THE INVENTION

The present invention provides a resin extraction process, which is designed to overcome the disadvantages of the processes for the extraction of resin from coal, which have been known in the prior art.

In accordance with the present invention, there is provided a process for the extraction of resin from coal, which process is operated in a continuous manner. The invention further provides a resin extraction process, employing a solvent for extraction purposes which solvent is substantially completely recovered. In addition, the invention provides a process for the extraction of resin from coal, which process assures the recovery of substantially all of the resin contained in the coal.

DESCRIPTION OF THE DRAWINGS

The invention will be described in conjunction with the accompanying drawings with FIG. 2 placed to the right of FIG. 1 which are a diagrammatic illustration of the process of the invention.

DESCRIPTION OF THE PREFERRED EMBODIMENT OF THE INVENTION

Referring to the drawing, there is shown a digrammatic illustration of a process for the extraction of a natural fossil resin from a resin-containing coal, such as a Utah coal. The coal, which is preferably in the form of fines having a size of minimum 16 mesh, is stored in a hopper 10. A tank 12 is provided for the storage of a solvent, consisting, by volume of 90 percent hexane and 10 percent chloroform.

Coal fines from the hopper 10 are continuously fed, through a conduit 14, into a first extraction tank 16. At the same time, solvent is continuously fed from the storage tank 12 into the tank 16, through conduits 18 and 20. The ratio of solvent feed to coal feed is referably maintained at 4:1, which is the maximum saturability of the solvent. The mixture of solvent and coal fines is continuously agitated in the tank 16. Such agitation not only serves to prevent settling of the coal fines to the bottom of the tank 16; but also serves to assure complete exposure of the contained resin to the solvent. A substantial portion of the resin contained in the coal fines is thus placed in solution in the tank 16.

The mixture of coal fines and resin-containing solution produced in the tank 16, is pumped from the latter by a pump 22, and through a conduit 24, into a second extraction tank 26. In the tank 26, the mixture is again agitated for further resin dissolution. The combined dwell period in the two tanks 16, 26 is preferably a minimum of about fifteen minutes, for placement in solution of substantially all of the resin contained in the coal fines.

The mixture of coal fines and solution containing substantially all of the extracted resin, is pumped from the tank 26 by means of a pump 28, through a conduit 30, and into a first cyclone separator 32. The pumping pressure is within the approximate range of 50–60 p.s.i., the maximum pressure for separation of the coal fines from the solution in the separator 32. Such separation takes place as a result of the rate of flow of the mixture, and of the difference in specific gravity, as between the solvent and the coal fines. A quantity of solution containing a major portion of the dissolved resin is discharged from the top of the separator 32, and through a conduit 34. Such overflow solution preferably contains about 75 percent of the extracted resin. The overflow solution also contains a small quantity of coal fines, being of the order of minus 25 microns in size.

A mixture of the bulk of the coal fines, together with solution containing the remaining portion of the extracted resin, is discharged from the bottom of the separator 32, and through a conduit 36. Such underflow from the separator 32 is conducted through the conduit 36 into a first dilution tank 38. In the tank 38, the mixture is diluted, with agitation, resin solution containing a small quantity of resin, and which has been recycled to the tank 38 through a conduit 40, from a subsequent process stage.

The mixture is pumped from the tank 38 by means of a pump 42 operating at a pressure of 50–60 p.s.i., through a conduit 44, and into a second cyclone separator 46. In the separator 46, a quantity of solution containing substantially all of the remaining portion of the extracted resin (approximately 25 percent), is separated as overflow, for discharge through a conduit 48.

The underflow from the separator 46 is pumped from the latter through a conduit 50, and into a second dilution tank 52. In the tank 52, the mixture is diluted, with agitation, with relatively clear solvent, which has been recycled to the tank 52, through a conduit 54, from a subsequent process stage.

The mixture is pumped from the tank 52 by means of a pump 56 operating at a pressure of 50–60 p.s.i., through a conduit 58, and into a third cyclone separator 60. The overflow from the separator 60 is a resin solution, containing a small quantity of resin. Such overflow is recycled through the conduit 40 to the tank 38.

The underflow from the separator 60 is conducted through a conduit 62 to a third dilution tank 64. In the tank 64, the mixture is diluted, with agitation, with fresh solvent, received from the tank 12 through conduits 18 and 66.

The mixture, which is substantially resin-free, is pumped from the tank 64 by means of a pump 68 operating at a pressure of 50–60 p.s.i., through a conduit 70, and into a fourth cyclone separator 72. The overflow from the separator 72 is relatively clear, and is recycled through the conduit 54 to the tank 52.

The underflow from the cyclone 72 is conducted through a conduit 74 into a tank 76. In the tank 76, the mixture is diluted, with agitation, with fresh solvent, received from the tank 12 through conduits 18 and 78.

The mixture from the tank 76 is pumped, by means of a pump 80, through a conduit 82 and into a fifth cyclone separator 84. Since substantially all of the solubles have been removed from the coal at this stage of the process, the overflow from the separator 84 is clear solvent. Such solvent is returned, through a conduit 86, to the extraction tank 16.

The underflow from the separator 84, which consists of a mixture of coal fines and solvent, is conducted through a conduit 88 to a heated screw conveyer 90. The screw conveyer 90 is of the type providing a screw 91, surrounded by a jacket 92 which is heated by steam. In the screw conveyor 90, the coal is dried, and the solvent recovered. The dried coal is discharged through an outlet 93. The recovered solvent is pumped, by means of a pump 94, through conduits 96 and 98 to the tank 12.

The quantities of solution obtained as overflow from the separators 32 and 46 are combined to form a liquor, such liquor all of the extracted resin, together with a small portion of coal fines which are minus 25 microns in size. The liquor is conducted through a conduit 100 to a deep well clarifier 102. In the clarifier 102, the coal fines settle to the bottom.

The underflow from the clarifier 102 is conducted, through a conduit 104, to a concurrent flow centrifuge 106. In the centrifuge 106, a major portion of the coal fines are removed, for discharge as a cake at the centrifuge outlet 108. The overflow from the centrifuge 106 is returned to the clarifier 102 through a conduit 110. The cake discharged through the outlet 108 is collected for further processing.

The overflow from the clarifier 102 is conducted through a conduit 112 to a continuous pressure pre-coat filter 114. The filter 114 serves to remove the last traces of coal fines, along with any other impurities in the liquor.

The underflow from the filter 114, consisting of coal fines, is discharged at the filter outlet 116, and sent to further processing along with the cake obtained from the centifuge 106. The overflow liquor obtained in the filter 114 is conducted, through a conduit 117, to a combined evaporator and condensor 118. In the evaporator-condensor 118, solvent is separated from the liquor, for return to the tank 12 through conduits 120 and 98.

The concentrated liquor is conducted from the evaporator-condensor 118 through a conduit 122, and into a spray dryer 124. The dryer 124 is of the type providing a drying chamber, which is heated by a steam jacket. In the drying chamber, a powdered dry resin is released from the solvent. Such resin is collected at the dryer outlet 126. The solvent is recovered, and conducted through a conduit 128 to a condensor 130. The condensed solvent is returned to the tank 12 through conduits 132 and 98.

Because of the volatile nature of the solvent employed in the process of the invention, all processing equipment is operated at full capacity, to preclude the introduction of air into the system.

EXAMPLE

Coal fines, having a size of minus 16 mesh, were continuously fed, at the rate of 68.5 lbs./min. into a first extraction tank 16 of 2,000 gallon size. Also fed into the first extraction tank 16, at a rate of 50 g.p.m., was a solvent, consisting of a mixture of 90 percent hexane and 10 percent chloroform, by volume. The mixture of solvent and coal fines was constantly agitated in the first extraction tank 16, for dissolution of a large portion of the resin.

The mixture of coal fines and resin containing solution produced in the first extraction tank 16 was pumped from the latter at a rate of 50 g.p.m., and into a second extraction tank 26 having a capacity of 1,000 gal. In the latter tank 26, the mixture was again agitated for dissolution of the remaining portion of the resin.

The mixture of coal fines and solution containing substantially all of the extracted resin was pumped from the second extraction tank 26 and into a first 4 inch cyclone separator 32. The pumping pressure was within the approximate range of 50–60 p.s.i. Discharged as overflow from the first separator 32 at the rate of 33 g.p.m., was a quantity of solution containing 75 percent of the extracted resin. The overflow solution also contained coal fines, being minus 25 microns in size, and being discharged at the rate of 1.6 lbs./min.

The bulk of the coal fines was discharged as underflow from the first separator 32, at the rate of 65 lbs./min., along with 17 g.p.m. of solvent. Such underflow from the first separator 32 was conducted to a first 1,000 gal. dilution tank 38. The mixture was here agitated, and diluted with solvent containing a small portion of resin, and having been recycled to the first dilution tank 38 from a subsequent process stage, at the rate of 33 g.p.m.

The mixture was pumped from the first dilution tank 38 at a pressure of 50–60 p.s.i., and into a second 4 inch cyclone separator 46. In the second separator 46, a quantity of solution containing substantially all of the remaining portion of the extracted resin (approximately 25 percent), was separated as overflow.

The underflow from the second separator 46 was pumped into a second 1,000 gal. dilution tank 52. In the latter, the mixture was agitated, and diluted with 33 g.p.m. of relatively clear solvent, recycled to the second dilution tank 52 from a subsequent process stage.

The mixture was pumped from the second dilution tank 52 at a pressure of 50–60 p.s.i., and into a third 4 inch cyclone separator 60. The overflow from the third separator 60, a mixture of solvent and a small quantity of resin, was recycled, at the rate of 33 g.p.m., to the first dilution tank 38.

The underflow from the third separator 60 was conducted to a third dilution tank 64. In the latter, the mixture was agitated, and diluted with 33 g.p.m. of fresh solvent.

The mixture, which was substantially resin-free, was pumped from the third dilution tank 64 at a pressure of 50–60 p.s.i., into a fourth 4 inch cyclone separator 72. The overflow from the fourth separator 72 was relatively clear, and was recycled, at the rate of 33 g.p.m., to the second dilution tank 52.

The underflow from the fourth separator 72 was conducted to a fourth dilution tank 76. Here, the mixture was agitated, and diluted with fresh solvent, introduced at the rate of 33 g.p.m.

The mixture was pumped from the fourth dilution tank 76, at a pressure of 50–60 p.s.i., and into the fifth cyclone separator 84. The overflow from the fifth separator was clear solvent.

The underflow from the fifth separator 84, which consisted of a mixture of coal fines and solvent, was conducted to a heated screw conveyor 90. The conveyor 90 was 24 feet long and 24 inches in diameter, being heated by steam at 50 p.s.i.g., to a temperature of 220° F. The coal was thus dried, and the solvent recovered.

The quantities of solution obtained as overflow from the first and second separators 32 and 46 were combined to form a liquor containing 66 g.p.m. of dissolved resin, together with .6 lb./min. of coal fines, which were minus 25 microns in size. The liquor was conducted to the deep well clarifier 102.

The underflow from the clarifier 102, containing 2.7 lbs./min. of coal fines, was conducted at the rate of 2 g.p.m. to a concurrent flow centrifuge 106. In the latter, 80–85 percent of the coal were removed, and a cake containing 18–25 percent solids was obtained. The overflow from the centrifuge 106 was returned to the clarifier 102.

The overflow from the clarifier 102, containing .6 lb./min. of solids, was conducted at a the rate of 64 g.p.m. to a continuous pressure pre-coat filter 114, providing 125 square feet of filter surface. The underflow from the filter 114 contained .6 lb./min. of coal fines. The liquor obtained in the filter 114 was conducted at the rate of 65.3 g.p.m. to a combined evaporator and condensor 118. Here, the liquor was condensed to 50 percent solids, and 32.7 g.p.m. of solvent was recovered.

The concentrated liquor was conducted, at a pressure of 50 p.s.i., into the spray dryer 124. The drying chamber of the latter was heated to 325° F. at 100 p.s.i.g. A powdered dry resin was thus obtained. The solvent was also recovered.

What is claimed is:

1. A process for the extraction of resin from resin bearing coal, which process comprises:
    (a) subjecting resin-containing coal fines to an integrated solvent-extraction and solution-separation procedure for obtaining both a first quantity of resin solution containing a major portion of said resin, and a mixture of coal fines and solution containing substantially all of the remaining portion of said resin;
    (b) subjecting said mixture to a series of integrated solvent-dilution and solution-separation procedures for obtaining both a second quantity of resin solution containing substantially all of the remaining portion of said resin, and a residual mixture of coal fines and solvent; and
    (c) recovering substantially all of the resin contained in said first and second quantities of resin solution.

2. A process in accordance with claim 1, in which said first and second quantities of resin solution are obtained, and said resin is recovered, in a continuous manner.

3. A process in accordance with claim 1, in which substantially all of the solvent in said first and second quantities of solution, and in said residual mixture, is recovered.

4. A process in accordance with claim 1, in which the coal fines in said residual mixture, together with inter-mixed solvent, are recovered by passage through a heated screw conveyer, adapted to dry said coal fines by removal of said inter-mixed solvent.

5. A process in accordance with claim 1, in which the solvent employed is a mixture of hexane and chloroform.

6. A process in accordance with claim 1, in which the solvent employed is a mixture of ninety percent hexane and ten percent chloroform, by volume.

7. A process in accordance with claim 1, in which the solution-separation phase of each of said integrated procedures is accomplished by cyclone separation.

8. A process in accordance with claim 7, in which said cyclone separation is conducted at a pressure within the approximate range of 50–60 pounds per square inch.

9. A process in accordance with claim 1, in which said first quantity of separated solution contains approximately 75 percent of the resin in said mixture.

10. A process in accordance with claim 1, in which the solution separated in the solution-separation phase of at least one of the integrated procedures of said series is recycled for use in the solvent-dilution phase of a previous integrated procedure of said series.

11. A process in accordance with claim 10, in which said series provides four integrated solvent-dilution and solution-separation procedures, the solutions separated in the solution-separation phases of the second and third integrated procedures being recycled for use in the solvent-dilution phases of the first and second integrated procedures, respectively, fresh solvent being employed in the solvent-dilution phase of each of the third and fourth integrated procedures.

12. A process in accordance with claim 1, in which said first and second quantities of separated solution are passed in combination through a deep well clarifier, for separation of a substantial portion of the coal fines contained in said combined solution.

13. A process in accordance with claim 12, in which said separation is aided by passage of the separated coal fines, together with adhering solution, through a concurrent-flow centrifluge, operating in conjunction with said deep well clarifier.

14. A process in accordance with claim 12, in which the clarified solution is conducted through a pressure pre-coat filter, for removal of substantially all traces of coal fines contained in said clarified solution.

15. A process in accordance with claim 14, in which the filtered solution is concentrated by evaporation and condensation.

16. A process in accordance with claim 15, in which resin is recovered from the concentrated solution by spray-drying.

17. A process in accordance with claim 2 in which the solvent employed is a mixture of hexane and chloroform.

18. A process in accordance with claim 2 in which the solution-separation phase of each of said integrated procedures is accomplished by cyclone separation.

19. A process in accordance with claim 17 in which the solution-separation phase of each of said integrated procedures is accomplished by cyclone separation.

References Cited

UNITED STATES PATENTS

| | | | |
|---|---|---|---|
| 2,453,543 | 11/1948 | Schabelitz | 260—107 |
| 2,506,301 | 5/1950 | Klepetko et al. | 260—107 |
| 2,506,300 | 5/1950 | Klepetko et al. | 260—107 |
| 2,546,364 | 3/1951 | Klepetko | 260—107 |
| 2,630,377 | 3/1953 | Lewis | 23—270 |

FOREIGN PATENTS

| | | | |
|---|---|---|---|
| 130,210 | 11/1932 | Austria | 260—107 |

OTHER REFERENCES

Chemical Engineers' Handbook (J. H. Perry, Editor), Third Edition, pages 714–716, 747, 862, 875–876, and 1024 (1950).

Paint, Oil & Chemical Review, Issue of June 10, 1948, pages 8–9, 50, 52, 54, 56, and 58 (1948).

HOSEA E. TAYLOR, Primary Examiner

W. E. PARKER, Assistant Examiner

U.S. Cl. X.R.

23—272.6, 312